UNITED STATES PATENT OFFICE.

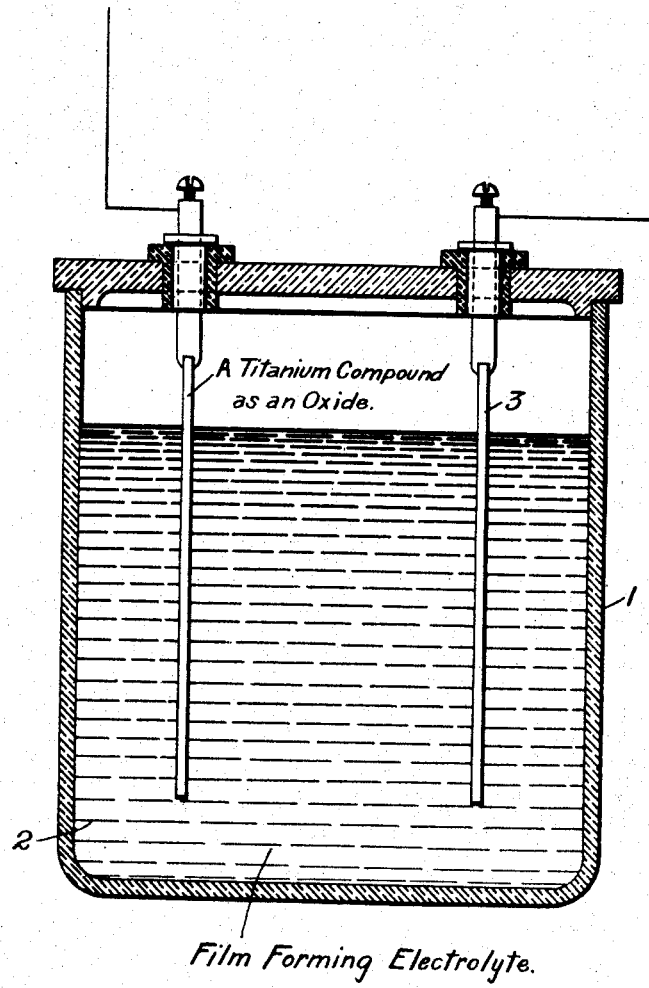

LEWIS WARRINGTON CHUBB, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTROLYTIC CELL.

1,344,753.  Specification of Letters Patent.  Patented June 29, 1920.

Original application filed February 3, 1917, Serial No. 146,443. Divided and this application filed March 7, 1919. Serial No. 281,143.

*To all whom it may concern:*

Be it known that I, LEWIS WARRINGTON CHUBB, a citizen of the United States, and a resident of Pittsburgh, in the county of Allegheny and State of Pennsylvania, have invented a new and useful Improvement in Electrolytic Cells, of which the following is a specification, this application being a division of application Serial No. 146,443, filed Feb. 3, 1917.

My invention relates to electrolytic cells, such as condensers, lightning arresters, rectifiers and the like, consisting of plates or other active members which are composed of film-forming material and are adapted for immersion in suitable film-forming electrolytes.

The object of my invention is to provide active conducting members for electrolytic cells of the above-indicated character which shall be composed, wholly or in part, of compounds of titanium.

Electrolytic cells of the kind to which my invention relates depend, for their operation, upon the property possessed by certain substances of acquiring asymmetric conducting films when impressed with electric potential in the presence of a suitable film-forming electrolyte. The metal most commonly employed for this purpose is aluminum but the same property of forming asymmetric conducting films is possessed by other metals and also by certain non-metallic substances.

I have discovered that compounds of titanium, such as titanium oxids, are well suited for use as the active material in electrolytic cells of the above-indicated character, because of their ability to form asymmetric conducting films and also because the superficial films formed possess very high specific inductive capacitance and are thin enough to have a high capacitance per unit area.

Plates having desirable characteristics may be made from certain compounds of titanium, such as titanium dioxid, in the form of natural rutile, or iron-titanium oxid in the form of ilmenite. Since it is difficult to obtain masses of these substances of the proper size and shape for use as the active members of electrolytic cells, the oxids may be applied in finely divided form to the surfaces of supporting plates of other materials such as aluminum.

I have found that the titanium film has a specific capacitance many times greater than that of the aluminum film, being about 80, or nearly the specific inductive capacitance of pure water. Titanium plates may be operated at moderately high alternating-current voltages, the permissible voltage which the films will withstand being dependent, in a general way, upon the nature of the treatment which the plates have received. The great superiority of titanium, with respect to capacitance per unit of surface, is sufficient to render the titanium plates much better in service than aluminum plates.

The drawing discloses a conventional electrolytic condenser which may comprise a container 1 for the film-forming electrolyte 2 in which are disposed electrodes 3 embodying my invention and formed wholly or in part of certain compounds of titanium, such as titanium oxid or hydroxid.

It is to be understood that my present invention is not restricted to plates of any particular form or size or to any particular kind of service, since plates of titanium compounds, such as oxids, may be used in electrolytic cells under all circumstances where aluminum plates have heretofore been employed. The entire plate should not be compossed of a titanium compound but should consist of aluminum, iron or other conducting material provided with a surface of titanium compound, the plates in such cases operating substantially as if the plate were originally made entirely of titanium.

In view of the wide variety of applications to which my invention is adapted, it is to be understood that no limitations are to be imposed thereon except such as are indicated in the appended claims.

I claim as my invention:

1. An electrode for electrolytic cells comprising a compound of titanium.

2. An electrode for electrolytic cells comprising an oxid of titanium.

3. A film-forming conductor for electrolytic cells adapted for immersion in an electrolyte and having a surface exposed to the electrolyte that is composed of a titanium compound.

4. A film-forming conductor for electrolytic cells adapted for immersion in an electrolyte and having a surface exposed to the electrolyte that is composed of an oxid of titanium.

5. An electrolytic cell comprising an electrolyte and a plurality of electrodes, at least one of which comprises a compound of titanium, coöperating with the electrolyte.

6. An electrolytic cell comprising an electrolyte and a plurality of electrodes, at least one of which comprises an oxid of titanium, coöperating with the electrolyte.

7. An electrolytic cell comprising an electrolyte and a plurality of electrodes, at least one of which has a surface exposed to the electrolyte that is covered with an asymmetric film of a titanium compound.

In testimony whereof I have hereunto subscribed my name this 19th day of Feb., 1919.

LEWIS WARRINGTON CHUBB.